July 23, 1935.  T. VAN BUUREN  2,008,805
MILK BOILING APPARATUS
Filed Feb. 9, 1934

Inventor
Theodoor van Buuren

By Emil Bönnelycke
Attorney

Patented July 23, 1935

2,008,805

UNITED STATES PATENT OFFICE 2,008,805

MILK BOILING APPARATUS

Theodoor van Buuren, Amsterdam, Netherlands

Application February 9, 1934, Serial No. 710,557
In the Netherlands April 10, 1933

6 Claims. (Cl. 53—1)

The present invention relates to milk boiling vessels provided with means for preventing boiling over, and is an improvement in or modification to the invention forming the subject matter of my prior U. S. Patent No. 1,927,224. The said prior patent comprises a milk boiling vessel, an open-topped channel member communicating with the upper portion of the boiling vessel, said channel member being upwardly inclined from the boiling vessel so that milk boiled over in the channel member will be returned to the boiling vessel, and said channel member being of a length greater than the diameter of the boiling vessel.

The milk boiling vessel according to the Patent No. 1,927,224 exhibited in practice the disadvantage that the channel member had to be made fairly long, as a result of which the boiling vessel frequently got in the way of the other cooking vessels on the heating surface or heating plate.

The improvement or modification according to the present invention removes the aforesaid disadvantage and differs from the patented device in that a loose plate is provided in the milk boiling vessel. This loose plate extends up to a point above the entry of the channel member and does not exactly fit up against the walls of the vessel. It is ranged in the latter in an inclined position in such manner that the vessel is subdivided into two communicating compartments. The bottom of the vessel forming part of that compartment which is located at the greater distance from the channel member, and several supporting members serve to prevent the plate from tipping over in the direction of the channel member.

The milk which is in contact with the bottom of the vessel will boil over first and will pass over the upper edge of the plate into the other compartment and extend into the channel member. As a result of this the channel member can be made much shorter than would otherwise be the case, while a cooling down by means of the plate is effected.

A preferred constructional form of a milk boiling vessel according to the invention is illustrated by way of example in the accompanying drawing, in which.

Figure 1:
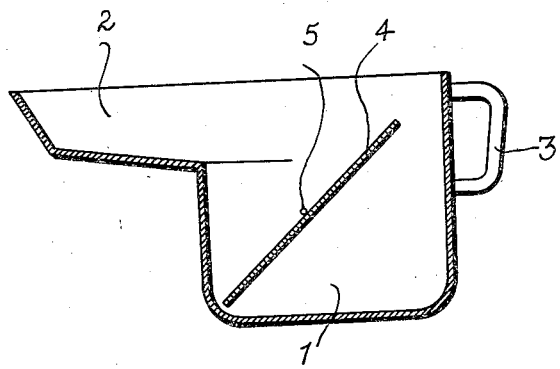
Fig. 1 is a vertical section through the boiling vessel.
Figure 2:
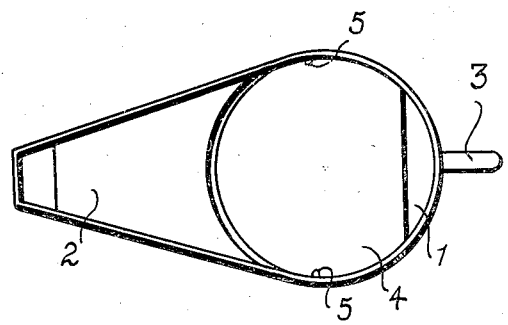
Fig. 2 is a plan thereof.
Figure 3:
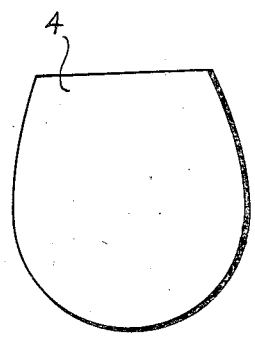
Fig. 3 is a view of the plate.

The reference numeral 1 denotes the boiling vessel, 2 denotes the channel member for the reception, when necessary, of a part of the rising boiling milk, and 3 denotes the handle.

In the boiling vessel 1 a loose plate 4 which divides the boiling vessel into two compartments is arranged in an inclined position. The plate 4 extends at its upper edge to a height above the lower wall of the channel member 2 and does not exactly fit up against the walls of the container but leaves sufficient space for the two compartments to communicate with one another. The inclined position of the loose plate 4 is such that the whole of the bottom of the boiling vessel apparatus appertains to or forms part of that compartment which is located at the greater distance from the channel member. Means are also provided for preventing the plate from tipping over in the direction of the channel member. The said means may, for example, consist of supporting members 5 arranged on the inner wall of the boiling vessel. The plate 4 may be provided at the upper end with a handle in order to put same in or out.

The vessel may be used as follows:

Before heating, the vessel is to be filled with milk up to a level at about the bottom of the channel member 2. The milk in the compartment which is located at the greater distance from the channel member 2 will boil over first and will pass over the plate 4 into the other compartment. After some time the milk extends in the channel member 2, and being cooled down therein flows back into the boiling vessel again. Owing to the function of the plate in combination with the channel member the boiling over will be absolutely prevented even after the expiration of a considerable time.

Due to the fact that the two compartments communicate with each other and the plate 4 does not exactly fit up against the walls of the vessel as soon as the milk passes over the said plate in the other compartment it will flow back into the first compartment, so that an intensive cooling is effected.

I claim as my invention:

1. A milk boiling apparatus comprising a boiling vessel, an upwardly inclined channel member extending laterally from said vessel, a loose plate in the boiling vessel extending up to a point above the entry of the channel member and slightly spaced from the walls of the vessel, said plate being arranged in the vessel in an inclined position in such a manner that the vessel is subdivided into two communicating compartments, the bottom of the vessel forming part of the compartment located at the greater distance from the channel member, and supporting members in said vessel to prevent tipping of the plate.

2. A milk boiling apparatus comprising a boiling vessel, a laterally projecting upwardly inclined channel member communicating with the upper portion of said vessel, and an inclined partition dividing said vessel into two compartments and extending upwardly to a level between the upper edge of the vessel and the bottom of said lateral projecting channel, said partition being positioned so that the bottom of the vessel forms a wall of one compartment and the channel communicates with the other compartment.

3. A milk boiling apparatus comprising a boiling vessel, a laterally projecting channel member communicating with the upper portion of said vessel to receive milk which is raised above the level of said channel in said vessel due to boiling, and a partition positioned in said vessel between the bottom thereof and the point at which the channel is joined to the vessel.

4. A milk boiling apparatus comprising a boiling vessel, a laterally projecting channel member communicating with the upper portion of said vessel to receive milk which is raised above the level of said channel in said vessel due to boiling, and a partition extending from the intersection of the bottom of the vessel with the side wall immediately beneath said channel upwardly and across said vessel to a point spaced from the side wall opposite said channel and above the level of said channel.

5. A milk boiling apparatus comprising a boiling vessel, laterally projecting means communicating with the upper portion of said vessel at a point above the normal milk level to receive the overflow due to boiling and return it to the vessel, and means positioned in said vessel to divert the bubbles of gas and vapor arising from the bottom of said vessel to prevent their direct passage to said channel.

6. A milk boiling apparatus comprising a boiling vessel, laterally projecting means communicating with the upper portion of said vessel at a point above the normal milk level to receive the overflow due to boiling and return it to the vessel, and means positioned in said vessel to prevent the direct flow of bubbles of gas and vapor, evolved by boiling the milk, to said channel.

THEODOOR VAN BUUREN.